March 12, 1968  S. GAABS  3,372,913
ROTARY DEVICE FOR HEAT TREATMENT OF PIPES
Filed Oct. 11, 1965  2 Sheets-Sheet 1
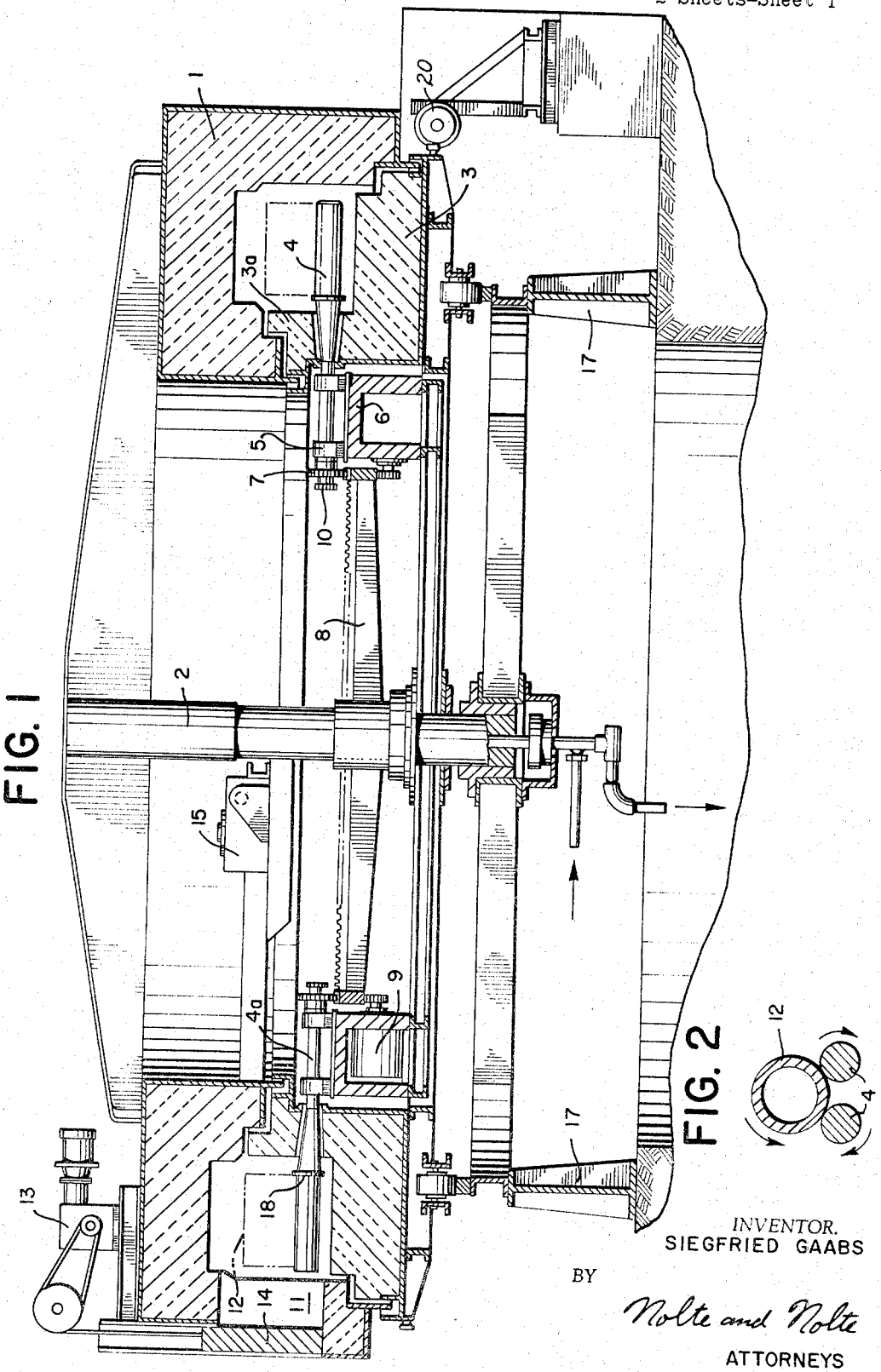
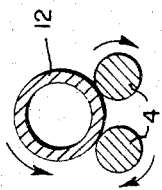
INVENTOR.
SIEGFRIED GAABS
BY
Nolte and Nolte
ATTORNEYS

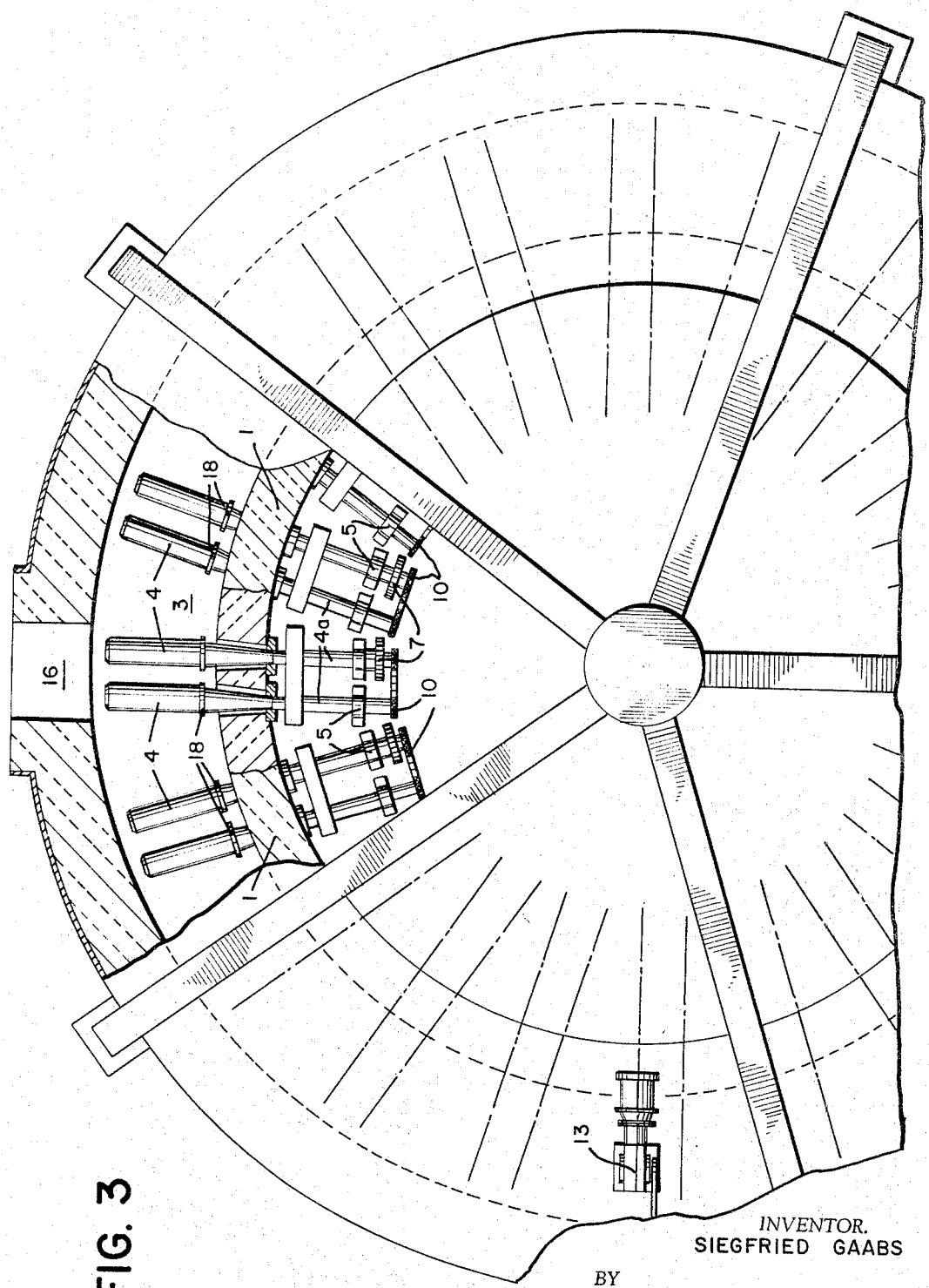

3,372,913
ROTARY DEVICE FOR HEAT TREATMENT
OF PIPES
Siegfried Gaabs, Berlin-Weissensee, Germany, assignor to VEB Lokomotivbau-Elektrotechnische Werke "Hans Beimler," Henningsdorf, Germany
Filed Oct. 11, 1965, Ser. No. 494,773
7 Claims. (Cl. 263—7)

ABSTRACT OF THE DISCLOSURE

A rotary hearth furnace for heat treatment of pipes of a thermoplastic material, preferably of scoria, having a ring shaped heating channel defined by a stationary cover portion carrying heating elements and by a step-by-step driven hearth portion, a plurality of roller pairs arranged radially within said heating channel for supporting rotatably the pipes to be treated, whereby said roller pairs are driven by separate driving means irrespective of the motion of said hearth portion.

---

The invention relates generally to a device for heat treatment of pipes, and more particularly, to a rotary furnace for treatment of pipes made from metals, ceramics, plastics and especially from slag or scoria, which are in a plastic state.

It is known in connection with scoria pipes, which are produced in a mold casting or centrifugal casting process, to use subsequent tempering at temperatures of from 650° C. to 930° C., in casting pits, in which the scoria pipes remain in a vertical position, during the entire tempering process.

For heating and scaling of metal and non-metal mold bodies, industrial furnaces are known which preferably have a ring-shaped base area. This is especially the case in rotating furnaces and furnaces having rollers which transport the mold bodies. Rotating furnaces of the common type, receive the mold bodies in a rest position, which are then moved to the heating zone, while the roller type furnace transports the mold bodies by means of stationary rollers to the heating zone.

Due to the difference in the cooling rates of the shell and core zones, a hard, brittle shell zone is formed in the scoria pipes subsequent to the casting process, while the inside of the pipe is still in a plastic state. This condition is disadvantageous during the tempering process of the scoria pipes in casting pits, and in rotational furnaces, in that plastic deformation of the semi-hard pipes, caused by their own weight, occurs in the longitudinal direction of the pipes, when the pipes are in a vertical position, or in a radial direction when the pipes are in a horizontal position.

Due to these deformations of the pipe core zones, the pipes assume a barrel-like core or an unicircular form, whereby cracks form at the upper face of the hard shell zone and breakage will occur at the surface area. The permanent deformations and upper face cracks of scoria pipes are disadvantageous, and are the result of improper handling of the scoria pipes during the tempering process, due to miscalculation of their characteristics.

A method for tempering semi-hard scoria pipes is known, wherein the scoria pipes are bunched together in an axially parallel relation with respect to each other. The pipes are mounted on rollers, which are rotated at a uniform and constant speed in the same direction. By this process, the form of the pipes, defined by the casting process, is maintained and stabilized during and after the tempering process.

Compartment furnaces for this method are known which consist of a single pair of rollers. The disadvantage of this device is that only one scoria pipe at a time can be tempered resulting in a long period of tempering when a quantity of pipes is to be tempered. Furthermore, furnaces having a number of stationary roller pins, which are provided in series with respect to each other, are utilized, whereby a conveyor type furnace area is formed by the axially arranged rollers and the drive thereof. However, this type of device is disadvantageous in that the furnace is undesirably long to receive the conveyor type furnace areas, and must provide at least one charging opening for each roller pair. Furthermore, the heating elements which are provided for each roller pair must be individually controlled according to the tempering process. This device requires a high degree of energy and prevents continuous operation. Ring-shaped furnaces with rollers cannot be employed for this purpose, in view of the required axially parallel arrangement of the pipes, and the method of transporting the pipes.

It is an object of the invention to overcome the shortcomings of the known devices which are used for tempering of scoria pipes, and to provide a device for a continuous making of scoria pipes having a smooth outer surface and which are cylindrical in form.

It is another object of the invention to provide a rotating furnace for heat treatment of pipes which are in a plastic state and, which are made of metal, ceramic, plastic and particularly of scoria, whereby the pipes are horizontally mounted on pairs of rollers during the heat treatment, while they are concentrically rolled with respect to their longitudinal axis.

According to this invention, a furnace is employed for the heat treatment of pipes which are in the plastic stage, the furnace comprising a ring-shaped stationary upper portion carrying the heating elements with an open lower end covering a ring-shaped rotating lower furnace portion which is driven in steps. The roller pairs are arranged on the rotating furnace portion parallel with respect to each other, or in a slight tapered plane with respect to the surface of the furnace, and are driven in the same direction. The bearing pins which carry the rollers, and which are controlled by the drive means extend through a vertical wall of the furnace, and are directed to the center of rotation of the rotational furnace, while the drive for the bearing pins is arranged in a space defined by the vertical inner wall of the rotating furnace.

It is yet another object of the invention to provide that only one bearing pin of each pair of rollers is driven by a drive wheel attached to a center pin. The upper teeth of the wheel engage a bevel gear of the driven bearing pin, while the lower teeth are driven by an electric motor. For the common movement of both rollers of a roller pair, known mechanical drive elements are provided on the bearing pin. The intersection of the axis of the directly driven rollers or bearing pins is located at the center of rotation of the rotational rollers, while the axis of the mechanically indirectly driven rollers or bearing pins are disposed with respect to a concentric circle of the rotational center, the radius of which is defined by the roller distance of a pair of rollers.

When using the inventive device, the pipes can be produced continuously, with a high quality and by keeping the correct dimensions, without any of the finishing operations and without waste. An essential advantage is the stepwise driven furnace together with the continuously driven roller system, which permits a separation of the transport movement of the material being heated, from the rotational movement of the furnace. Simultaneously, by the use of a stationary heating device, the heating process which occurs at a certain temperature curve is substantially independent from the sequence of operation. By mechanization of the tempering process, the number of pieces which can be produced can be substantially increased, and the device can be incorporated into automatically controlled conveyor systems.

The various features of novelty which characterize the invention are pointed out with particularity in the application annexed to and forming a part of this specification. For a better understanding of the invention, its operating advantages and the specific objects attained by its use, reference should be had to the accompanying drawing and descriptive matter in which:

FIG. 1 is a schematic view in section showing a rotating furnace in accordance with the invention;

FIG. 2 is a front view of a pair of rollers with a scoria pipe mounted thereon; and FIG. 3 is a plan view, partly in section, of the furnace shown in FIG. 1.

With reference to the drawings, it is seen that the device comprises a stationary portion 1 which carries heating elements (not shown) and which is supported by foundations and by a center axis 2. Upper portion 1 which is open at its lower end covers a rotating hearth 3, so that a ring-shaped closed heating channel having a rotating bottom is provided. The individual channels are isolated from each other by known insulating means. Roller pairs 4 which extend into the heating channel penetrate a vertical inner wall 3a of rotating hearth 3 with their associated bearing pins 4a. The rollers 4 are mounted in water cooled bearings 5 of frame 6. The drive of roller pairs 4 is performed by a bevel wheel 7 provided on bearing pin 4a of roller 4, and is driven by a two-sided bevel gear 8 which in turn is driven by a continuous drive 9, by means of an electric motor (not shown). The simultaneous drive of both rollers 4 is effected by a drive chain 10. The drive means 20 of rotating hearth 3 which is mounted on rollers can be actuated in steps in a known manner by means of a bevelled roller or worm gear.

Upper portion 1 is provided with a receiving opening 11 for scoria pipes 12. Opening 11 is closed by a door 14 and is actuated by means of an elevating mechanism 13. After tempering, scoria pipes 12 are removed from the heating channel by means of a hydraulically actuated discharge device 15, through discharge opening 16.

For carrying out maintenance work, rotating hearth 3 can be lowered after detachable supports 17 have been removed therefrom. The operation or sequence of the device, that is, the opening and closing of door 14, feeding and discharging of scoria pipe 12, and the moving of rotating hearth 3, is controlled via a relay which cooperates with a switching mechanism (not shown). The scoria pipes which are to be tempered are fed through openings 11 and are placed on rollers 4. Scoria pipes 12 are moved in accordance with the operational sequence of the device, through heating zones, whereby scoria pipes 12 constantly rotate in opposite direction with respect to the rotation of rollers 4. For a better guidance of scoria pipes 12, cam discs 18 may be provided on the rotating rollers 4.

The invention has been explained in view of a certain embodiment although it should be noted that the subject matter of the invention does not solely apply to the feature as outlined with respect to this embodiment, since various modifications, for instance, actuating of the rotating rollers for the furnace by means of a drive shaft, or a multiple drive shaft gear, do not exceed the scope of the invention. The inventive rotating furnace can also be used for the heating treatment of pipes made of metal, ceramic or plastic while they are still in a plastic state.

It is to be understood that the embodiments herein are shown merely for illustrative purposes and that the invention is not to be limited to the embodiment disclosed but defined by the scope of the appended claims.

What I claim is:

1. A rotary hearth furnace for heat treatment of pipes from thermoplastic material, preferably scoria, comprising; a ring shaped housing consisting of a stationary upper portion carrying heating elements and a rotatably mounted hearth portion, a heating channel defined by said stationary and rotatable portions therebetween, first drive means for said rotatable portion roller pairs subsequently mounted on said rotatable portion and adapted to rotatably support said pipes, and second drive means associated with said roller pairs for rotatably driving said roller pairs, irrespective of said first drive means.

2. The furnace as claimed in claim 1, wherein the axis of each of said roller pairs is directed towards the center of rotation of said circular housing whereby the axis of the rollers within each pair are parallel one to another.

3. The furnace as claimed in claim 2, wherein said heating channel is defined by a ring-shaped stationary upper portion the outside periphery of which is provided with a downwardly directed wall, and by a ring-shaped rotatable hearth portion the inside periphery of which is provided with an upwardly directed wall.

4. The furnace according to claim 3, wherein each roller of said roller pairs comprises roller bearing pin, said roller bearing pin being pivotally supported in bearings located outside said upwardly directed wall.

5. The furnace according to claim 4, wherein said second drive means comprise a center shaft pivotally supporting a two sided level gear, at least an electromotor associated with said rotatable hearth portion and adapted to drive said level gear, drive chain for driving pinions disposed at roller pins of each roller pair, and a drive pinion at each roller pair, said drive pinion being driven by said level gear.

6. The furnace according to claim 5, wherein flanges are arranged on front ends of each roller for retaining said pipes.

7. The furnace according to claim 5 comprising stepping first drive means and continuous second drive means.

References Cited
UNITED STATES PATENTS

| 1,664,749 | 2/1928 | Keene | 263—7 |
| 1,691,367 | 11/1928 | Baker | 263—7 |
| 1,728,750 | 9/1929 | Fatkin | 263—7 |
| 2,013,905 | 9/1935 | Adams | 263—7 |
| 3,230,596 | 1/1966 | Batigne et al. | 263—7 X |

FREDERICK L. MATTESON, Jr., *Primary Examiner.*

JOHN J. CAMBY, *Examiner.*